T. F. CAPP.
Improvement in Cultivators.

No. 115,159.                          Patented May 23, 1871.

Witnesses.                         Inventor.

115,159

UNITED STATES PATENT OFFICE.

THEOPHILUS F. CAPP, OF BLOOMINGTON, ILLINOIS.

IMPROVEMENT IN CULTIVATORS.

Specification forming part of Letters Patent No. 115,159, dated May 23, 1871.

*To all whom it may concern:*

Be it known that I, THEOPHILUS F. CAPP, of Bloomington, in the county of McLean and in the State of Illinois, have invented certain new and useful Improvements in Cultivators; and do hereby declare that the following is a full, clear, and exact description thereof, reference being had to the accompanying drawing and to the letters of reference marked thereon, in which drawing—

Figure 1:
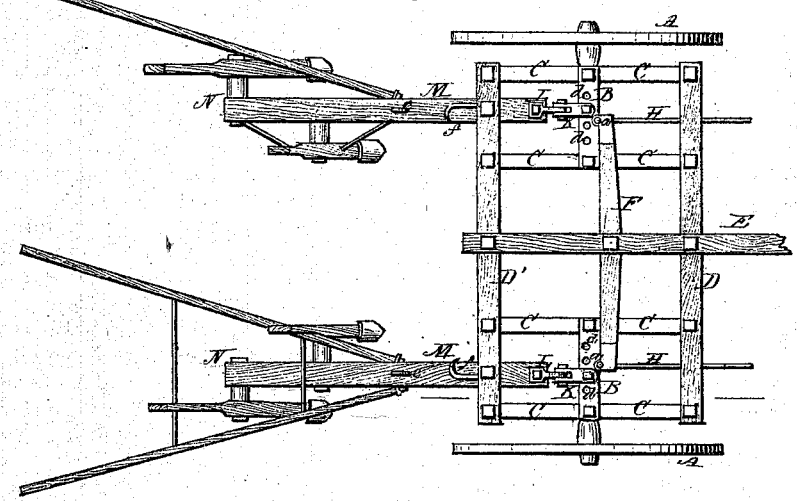
Figure 2:
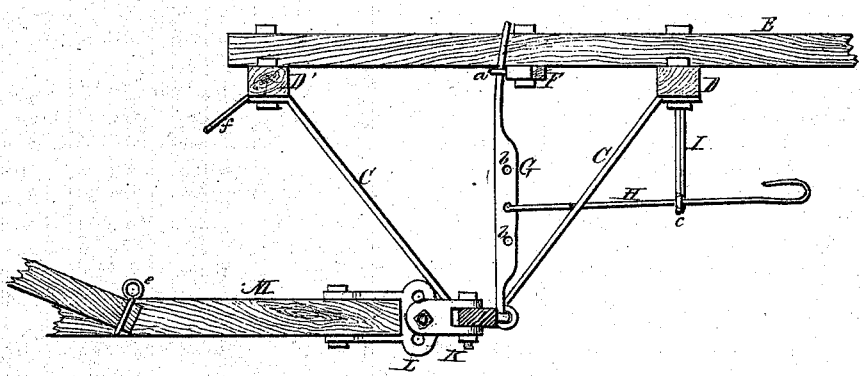

Figure 1 is a top-plan view of my cultivator, and Fig. 2 a vertical section on the line $x\ x$ of Fig. 1, showing particularly the evener and the mode of attaching the plows.

Letters of like kind denote similar parts in each figure.

The nature of this device relates to cultivators designed particularly for use with growing crops, and consists in the construction and arrangement of the frame and the axle.

In the drawing, A represents the traction-wheels, which turn on the outer ends of separate axles B, each of which extends about one-third distance between said wheels, and is supported upon and secured within the bights or bent portions of two parallel vertically-arranged metallic straps, C C, V-shaped, with the angle downward, which straps in turn are secured to the under sides of the frame cross-pieces D D', extending nearly from one wheel to the other, which pieces are parallel to each other, and arranged in line with the axles, one in front and the other in rear of the same, and at equal distances therefrom. The draft-pole E extends across the center of these frame-pieces, and is bolted to each of them. An evener, F, is bolted in such a way that it may turn freely to the under side of the draft-pole, at a point a little forward of the central space between the cross-pieces D and D', and has at each end an eye, a, pointing to the rear. A bar, G, which is pivoted to the rear central portion of each axle, has its upper end rounded and passing through said eye a, and its central portion flattened and provided with a series of holes, b, vertically arranged. Into one of these holes the draft-rod H is hooked and secured in any suitable manner, and extends forward, passing through an eye, c, in the yoke I, depending from the front cross-piece D, and terminating in a hook, to which the draft-chains are attached. The rear of each axle is provided with a series of holes, d, arranged side by side lengthwise of said axle. To one of these holes a knuckle, K, is pivoted, having lips above and below said axle, and a bolt passing down through said lips and through the axle in one of the holes before mentioned, by means of which the knuckle has a lateral movement and adjustment. The rear end of the knuckle has also two lips vertically arranged, between which the clevis L is pivoted, upon one of the several holes with which it is furnished, by means of which the clevis and the plow have a vertical movement. The clevis in turn is rigidly secured to the plow-beam M. The plows N, each having two shovels, are constructed and arranged in the usual manner of cultivators, except that one of them has but one handle. The top of each plow-beam has an eye, e, near its center, by means of which, when raised up from the ground, it may be fastened to a hook, f, secured to the under side of the rear cross-piece D', so as to be out of the way when the cultivator is not at work.

The object in having the short separate axles, and the open space between them and under the frame-work, is to permit the cultivator to be used in working upon each side of the rows of Indian corn when it has grown to a considerable height. The object of the construction and arrangement of the evener and its connections is to adjust the line of draft so as to have it conform as nearly as possible to a line drawn from the end of the plow-beams to the shoulders of the horses. The object of the construction and arrangement of the knuckles and clevis and holes in the axle is that the plows may be placed at a greater or smaller distance apart, as may be necessary, or have an independent lateral adjustment, if it is desired, that they may have a free lateral and vertical movement at the will of the plowman, for the purpose of avoiding obstacles or for any other reason. The object of the construction and arrangement of the frame is that the axles may be supported firmly, so that the wheels may rotate upon them, and that the whole structure may be light, simple, and at the same time strong and durable.

Having thus described my device, what I claim as my invention therein is—

The arrangement of the cross-pieces D D', the draft-pole E, the straps C C', the axles B, and the wheels A, when each of said parts is constructed substantially as described and shown, and as and for the purposes set forth.

In testimony that I claim the foregoing I have hereunto set my hand this 17th day of August, 1870.

THEOPHILUS F. CAPP.

Witnesses:
 JOHN T. WALTON,
 JAMES HERRON.